United States Patent [19]
Vinod

[11] Patent Number: 5,965,232
[45] Date of Patent: *Oct. 12, 1999

[54] DECORATIVE COMPOSITE FLOOR COVERINGS

[75] Inventor: Yashavant Vinayak Vinod, Hockessin, Del.

[73] Assignee: E.I. du Pont de Nemours & Co., Inc., Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/726,140

[22] Filed: Oct. 4, 1996

Related U.S. Application Data

[63] Continuation-in-part of application No. 08/494,869, Jun. 26, 1995, abandoned.

[51] Int. Cl.⁶ ........................................... B32B 33/00
[52] U.S. Cl. .................... 428/85; 428/908.8; 442/79; 442/93; 442/94; 442/102
[58] Field of Search ............................. 428/85, 90, 91, 428/95, 96, 97–100, 196, 204, 215, 219, 908.8, 340, 911; 442/283, 315, 318, 319, 370, 373, 374, 381, 383, 388, 389, 392, 213, 214, 215, 216, 224, 225, 227, 240, 241, 242, 246, 247, 249, 254, 260, 263, 264, 268, 270, 271, 272, 277, 278, 280, 281

[56] References Cited

U.S. PATENT DOCUMENTS

| | | |
|---|---|---|
| 2,629,678 | 2/1953 | Thompson et al. . |
| 2,688,578 | 9/1954 | Teague ........................................ 154/49 |
| 3,002,868 | 10/1961 | Boivin . |
| 3,360,422 | 12/1967 | Desch . |
| 3,458,337 | 7/1969 | Rugg . |
| 3,620,890 | 11/1971 | Kemmler . |
| 3,728,195 | 4/1973 | Bolles ..................................... 156/441 |
| 3,871,948 | 3/1975 | Norris . |
| 4,018,957 | 4/1977 | Werner et al. ........................... 428/141 |
| 4,030,168 | 6/1977 | Cole .......................................... 28/101 |
| 4,324,824 | 4/1982 | Narens et al. ............................. 428/92 |
| 4,522,857 | 6/1985 | Higgins .................................... 428/95 |
| 4,643,930 | 2/1987 | Ucci .......................................... 428/96 |
| 4,762,744 | 8/1988 | Woiceshyn et al. ..................... 428/219 |
| 4,822,373 | 4/1989 | Olson et al. ............................. 8/115.6 |
| 4,844,765 | 7/1989 | Reith ..................................... 156/306.6 |
| 4,883,839 | 11/1989 | Fitzgerald et al. ...................... 525/136 |
| 4,925,707 | 5/1990 | Vinod .................................. 427/393.4 |
| 4,939,036 | 7/1990 | Reith ....................................... 428/349 |
| 5,348,785 | 9/1994 | Vinod ........................................ 428/95 |

FOREIGN PATENT DOCUMENTS

| | | |
|---|---|---|
| 762634 | 7/1991 | Belgium . |
| 2017915 | 5/1970 | France ............................. B28D 7/00 |
| 2160631 | 6/1973 | France ............................. D06N 3/00 |
| 5-8360 | 1/1993 | Japan ............................. B32B 31/00 |
| 5-92538 | 4/1993 | Japan ............................. B32B 31/00 |
| 5-263372 | 12/1993 | Japan ............................. D06N 3/06 |
| 1080046 | 10/1967 | United Kingdom ............. B32B 2/20 |
| 1128801 | 10/1968 | United Kingdom ............. B22B 5/24 |
| 1194027 | 6/1970 | United Kingdom ............. B32B 5/02 |
| 2284612 | 9/1995 | United Kingdom ............. C08J 3/20 |
| WO 96/22414 | 7/1996 | WIPO ............................. D06N 7/00 |

*Primary Examiner*—James J. Bell

[57] ABSTRACT

A composite floor covering having an upper layer of a decorative fabric, a dimensionally stabilizing intermediate layer, and an optional lower cushioning layer has at least the upper surface of the decorative fabric coated with a protective polymeric coating in a manner such that the hand of the decorative fabric layer is substantially retained. The materials of the fabric layer, stabilizing layer, and cushioning layer (if provided) as well as the form of attachment therebetween, cooperate to render the floor covering substantially impervious to liquid.

24 Claims, 1 Drawing Sheet

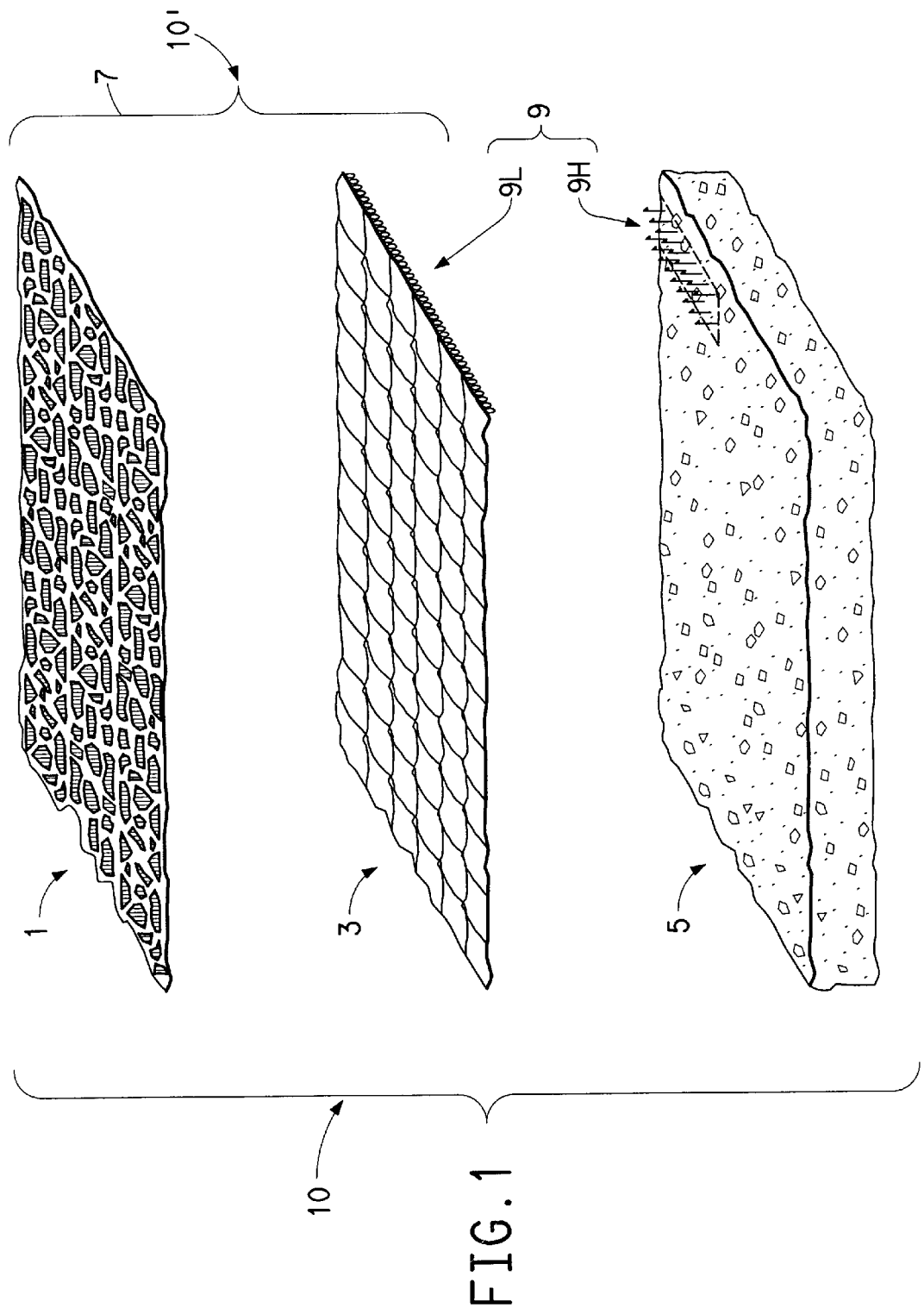

DECORATIVE COMPOSITE FLOOR COVERINGS

FIELD OF THE INVENTION

This application is a continuation-in-part of application Ser. No. 08/494,869, filed Jun. 26, 1995 and now abandoned.

FIELD OF THE INVENTION

This invention relates to a liquid-impervious composite floor covering having an upper layer of a decorative fabric, a dimensionally stabilizing intermediate layer, and optionally, a lower cushioning layer, wherein the decorative fabric has a protective polymeric coating which is applied so that the hand of the decorative fabric layer is substantially retained.

BACKGROUND OF THE INVENTION

Decorative floor coverings such as carpets and vinyl flooring are well known. Carpets offer greater comfort than vinyl flooring due to their soft, cushioning feel and better warmth. Vinyl flooring, owing to its protective surface layer, is more stain-resistant and is easier to clean than carpet. Although vinyl flooring is available in a wider variety of decorative designs than is carpet, the surface of vinyl flooring lacks the aesthetic appearance and the pleasing tactile qualities usually associated with decorative textile fabric. The tactile qualities of a fabric (such as softness, firmness, elasticity, fineness, smoothness, or other qualities perceptible by touch) are usually collectively referred to as the "hand" of the fabric.

It is believed that there exists a need for a composite floor covering which combines the advantages of carpet and vinyl flooring. The present invention is believed to provide such a composite floor covering.

SUMMARY OF THE INVENTION

This invention relates to a laminated composite floor covering comprising an upper decorative fabric layer, an intermediate stabilizing layer, and a lower cushioning layer. At least the upper surface of the decorative fabric layer is coated with a protective polymeric coating. The coating is applied in a manner so that the hand of the decorative fabric layer is substantially retained. For some applications the lower surface may be coated with the same or different protective polymeric coating.

The cushioning layer has a thickness of at least one-tenth (0.1) inches and a density of greater than three (3) pounds per cubic foot ($lb/ft^3$). The cushioning layer may itself comprise a carpet with yarn pile extending from a backing material.

Overall, the laminated composite floor covering has a density of at least ten (10) pounds per cubic foot ($lb/ft^3$) and a puncture resistance of at least eight-hundred (800) inch-pounds per square inch ($in-lb/in^2$).

The lower surface of the decorative fabric layer is attached to the upper surface of the stabilizing layer while the lower surface of the stabilizing layer is attached to the upper surface of the cushioning layer. The materials of the decorative fabric layer, the stabilizing layer, and the cushioning layer, as well as the materials used to attach each to the other are selected in a way that the composite floor covering is rendered substantially impervious to liquids.

In an alternate aspect, this invention is directed to a composite floor covering comprising a laminate formed of an upper decorative fabric layer and a stabilizing layer. Again, at least the upper surface of the decorative fabric layer is coated with a protective polymeric coating. The coating is applied in a manner so that the hand of the decorative fabric layer is substantially retained. The lower surface may be coated with the same or different protective polymeric coating. The materials selected for use in the decorative fabric layer and the stabilizing layer and for their attachment to each other are selected in a way that the composite floor covering is rendered substantially impervious to liquids. This embodiment of the present invention is useful in instances wherein the cushioning layer is already otherwise provided. To facilitate the mounting of this embodiment of the composite floor covering onto a cushioning layer the lower surface of the stabilizing layer is provided with a suitable mechanical fastener. A corresponding fastener may be provided on the cushioning layer onto which the composite floor covering material is mounted.

BRIEF DESCRIPTION OF THE FIGURES

FIG. 1 is a side-elevational view of a composite floor covering of this invention showing the different layers.

DETAILED DESCRIPTION OF THE INVENTION

The present invention provides a substantially liquid-impervious composite floor covering generally indicated by the reference character 10 having good cushioning properties and the pleasing aesthetics and tactile quality ("hand") usually associated with a textile fabric.

Referring to FIG. 1 the composite floor covering 10 comprises, in the preferred instance, an upper layer 1 of a decorative fabric having a protective polymeric coating, at least one intermediate stabilizing layer 3 for dimensional stability, and a lower cushioning layer 5 for cushioning and support. As will be discussed, the bracket 7 serves to indicate that in some instances it may be desirable to configure alternately the composite floor covering 10' without the inclusion of a cushioning layer. That is, the composite floor covering 10' in accordance with this alternate embodiment comprises the upper layer 1 of a decorative fabric having a protective polymeric coating attached to the intermediate stabilizing layer 3.

By the term "decorative fabric" as used herein it is meant a planar textile structure composed of yarns, fibers, or filaments and having an upper surface (facing) and lower surface, wherein the facing of the fabric provides a decorative effect and a pleasing aesthetic appearance. At least the upper surface of the decorative fabric layer 1 is coated with a protective polymeric coating applied so that the hand of the decorative fabric layer is substantially retained. The term "hand" is meant to denote the collective pleasing tactile qualities (such as softness, firmness, elasticity, fineness, smoothness, or other qualities perceptible by touch) usually associated with decorative textile fabric. The lower surface of the decorative fabric layer 1 may be coated with the same or different protective polymeric coating. The lower surface of the decorative fabric is attached to a stabilizing layer (as described further below).

These fabrics, wherein the decorative effect is provided by the fabric itself, differ from fabrics having a printed or decorated polymeric coating on their surface which are described in U.S. Pat. No. 3,620,890. In the present invention colors and designs can be applied to the fabrics by conventional techniques such as by dyeing the yarns, fibers or filaments which compose the fabric or by dyeing or printing the fabric itself. For example, in solution-dyeing processes, pigments are added to the fiber-spinnable polymer melt or solution prior to extrusion of the melt or solution through a spinneret to form solution-dyed fibers. Alternatively, the fibers may be pre-dyed by such techniques as "stock-dyeing" (the dyeing of fibers in staple form). Alternatively, the yarn may be pre-dyed before it used to form a fabric. Yarn dyeing techniques include skein-dyeing, space-dyeing and package-dyeing. Dyed yarns of different colors may be used to give the fabric multicolored patterns.

A second method for imparting color to fabrics is printing. In general, printing involves applying coloring agents onto the fabric which is then treated with heat or chemicals to fix the coloring agents. Printing techniques include, for example, pigment printing, roller printing, screen printing, and heat transfer printing.

Textile fabrics suitable for use in this invention include, for example, velours, felts, woven, non-woven, knitted, flocked, needle-punched, tufted fabric, stitch bond fabric and fusion-bonded fabrics. The fabrics are composed of natural or synthetic fibers. Such fibers include, for example, wool, cotton, polyamides (such as nylon 6,6, nylon 6, and copolymers thereof), polyesters, polyolefins (such as polypropylene), acrylics, rayon, silk and blends thereof. The fabrics may be textured or non-textured.

Synthetic fibers used to construct the fabric may have a denier per filament (dpf) in the range of about one (1) to about twenty-five (25) dpf. Sub-denier fibers may also be used. If a high tenacity fiber (such as the industrial yarn manufactured and sold by E. I. DuPont de Nemours and Company under the registered trademark Cordura®)is used for the fabric layer the denier per filament (dpf) should be in the range of about two (2) to about eight (8) dpf. If a bulked continuous filament is used for the fabric layer the denier per filament (dpf) should be in the range of about eight (8) to about twenty-eight (28) dpf. In a woven fabric, warp yarn may have a total yarn denier in the range of forty to five-hundred (40–500) and a weft yarn may have a denier range of one-hundred to four-thousand (100–4,000). Yarns composed of natural fibers such as cotton, silk and wool may also be used.

Each of the above-described fabrics (velours, felts, woven, non-woven, knitted, flocked, needle-punched, and fusion-bonded) are well known in the art. Generally, woven fabrics refer to fabrics composed of two sets of yarns, warp and filling, that are formed by weaving which is the interlacing of these sets of yarns. The three basic weaves are plain, twill, and satin. In the plain weave, yarns running in one direction (filling) go under and over alternate single yarns running in the other direction (warp). Plain weave fabrics are strong and durable. In the twill weave, yarns running in the filling direction go over one or more warp yarns and under groups of other yarns. Twill weave fabrics are strong with good shape-holding ability. In the satin weave, the face of the fabric consists almost entirely of warp or filling floats produced in the repeat of a weave. The points of yarn intersection are distributed as evenly and widely separated as possible. Satin-weave fabrics have a smooth, lustrous appearance.

Generally, non-woven fabrics refer to an assembly of textile fibers held together by interlocking in a random web or mat, by fusing of the fibers, or by bonding with an adhesive. Spun-bonded fabrics, such as those manufactured and sold under the registered trademarks Tyvek® or Typar®, are composed of randomly arranged, continuous filament fibers bonded at filament cross-over points. These fabrics are lightweight and have good tensile and tear strengths. Spunlaced fabrics, such as that manufactured and sold by E. I. DuPont de Nemours and Company under the registered trademark Sontara®, are composed of fibers entangled in a predetermined repeating pattern to form a strong, non-bonded structure.

Generally, knitted fabrics refer to fabrics which are constructed by interlocking a series of loops of one or more yarns. In warp knitting, the yarns generally run lengthwise in the fabric. In weft knitting, one continuous thread runs crosswise in the fabric making all of the loops in one course. Weft knitting includes circular knitting and flat knitting. In circular knitting, the fabric is produced on the knitting machine in the form of a tube, wherein the threads run continuously around the fabric. In flat knitting, the fabric is produced on the knitting machine in flat form, wherein the threads alternate back and forth across the fabric.

For purposes of this invention, the decorative fabric is a woven fabric and preferably has a weight of about ten (10) to about fifty (50) ounces per square yard ($oz/yd^2$) and a thickness of about one (1) mils to about two-hundred (200) mils. More preferably, the decorative fabric has a weight of about fifteen (15) to about thirty-two (32) ounces per square yard ($oz/yd^2$) and a thickness of about thirty-five (35) mils to about one-hundred-thirty-five (135) mils. These fabrics are especially suitable for use as an upper layer in the floor covering because of their durability and aesthetically pleasing appearance. The other fabrics as described above, which include knitted, velours, felts, non-woven, flocked, needle-punched and fusion bonded, can also be used as a top decorative fabric layer. In these instances the weight and the thickness of the fabric may be different than a woven fabric.

The decorative fabric is coated with a protective polymeric coating to provide the floor covering with various properties. For example, possible polymeric coatings include "stain-resist agents" which are polymer compositions that provide resistance to staining by acid dyes. These stain-resist agents include, for example, sulfonated phenol- or naphthol-formaldehyde condensate products and hydrolyzed vinyl aromatic-maleic anhydride polymers as described in U.S. Pat. No. 4,925,707, stain-resist compositions comprising mixtures of sulfonated phenol-formaldehyde condensate products with a hydrolyzed polymer of maleic anhydride and one or more ethylenically unsaturated aromatic monomers as described in U.S. Pat. No. 4,883,839, and stain-resist compositions of a partially sulfonated novolak resin and polymethacrylic acid as described in U.S. Pat. No. 4,822,373. In addition, "soil-resist" agents which are polymer compositions that provide resistance to soiling may be used. These soil-resist agents include, for example, fluorochemical compositions as described in U.S. Pat. No. 4,643,930. "Water-repellent agents" such as the fluorochemical, silicone, and acrylic compositions described in U.S. Pat. No. 5,348,785 may also be used. It is also understood that mixtures and blends of the above-described polymer compositions may be used, and that the coatings may contain other additives such as anti-microbial agents, UV stabilizers, antioxidants, and fillers.

The lower surface of the decorative fabric may also be coated with a polymeric coating. This polymeric coating may comprise the same or different compositions than the polymeric coating used for the upper surface. For instance, it may be desirable to use a polymeric coating comprising a water repellent agent as described in U.S. Pat. No. 4,643,930 on the lower surface of the decorative fabric to render the decorative fabric impervious to liquid spills. Various other coatings, including PVC, PVC plastisols and films, acrylic, latex, poly(vinyl chloride) resins, or polyurethane adhesives or foam coatings may also be used on the lower surface of the fabric layer. (These other coatings may be used on the upper surface of the fabric so long as they are applied in a manner which substantially retains the hand of the upper surface of the fabric). If the fabric layer is a woven fabric, the coating on the lower surface adds an additional advantage of non-slippage, which is, unraveling of the warp and weft threads of the woven fabric.

The polymeric coating may be applied to the fabric by such known techniques as extrusion, spraying, foaming, dipping, knife coating, transfer coating, or by lamination. In some instances, the polymeric coating may be subsequently cured by thermal heating, UV light, or fusion.

It is also recognized that it is not necessary to apply the polymeric coating directly onto the fabric. Rather, the polymeric coating may be applied to the fiber before the fiber is used to construct the fabric (so-called "producer applied" coating) or after the composite floor covering is installed.

It is important that the protective coating or finish is applied in a manner such that the fabric retains its hand and does not give the floor covering a "vinyl" or "plastic" feel. The preferred manner of applying the protective coating or finish is by dip, foam or spray application of the coating or finish to the upper surface of the fabric layer.

Another component of the composite floor covering in this invention is a reinforcing or stabilizing layer which provides dimensional stability to the floor covering. The stabilizing layer has an upper and lower surface. The upper surface is attached to the lower surface of the decorative fabric, while the lower surface is in contact and preferably attached to the cushioning layer as described further below. It is important that the floor covering have at least one stabilizing layer, and in some instances where additional stability is required, there should be multiple stabilizing layers. The stabilizing layer also promotes better adhesion between the first layer (decorative fabric) and the third layer (cushioning layer). The stabilizing layer also provides resistance against punctures to the decorative fabric and cushioning layer and tends to reduce the degree of indentation marks when furniture legs and the like are placed on the floor covering. Finally, the stabilizing layer can also provide resistance against wear when the floor covering is subjected to heavy foot traffic.

The stabilizing layer is typically a scrim or sheet material comprising a fibrous non-woven material or thermoplastic compound. The scrim may comprise an open network of intersecting strands such as, for example, fiberglass, polyolefin, polyamide, cotton, jute, acrylic and polyester strands. Fiberglass strands are particularly effective, because of their good tensile strength and "moisture stability." By the term, "moisture stability", it is meant that the length of the strands are substantially unchanged due changes in the temperature and humidity. For purposes of this invention, the thickness of the scrim should generally be in the range of about three (3) to about two-hundred-fifty (250) mils.

The scrim may be produced by such techniques as described in U.S. Pat. Nos. 3,728,195, 4,030,168 and 4,762,744. Typically, the amount of strands running in the "machine direction" (length direction), i.e., the direction in which the scrim is being produced by the machine and the amount of strands running in the "cross direction" (width direction), i.e., the direction perpendicular to the direction in which the scrim is being produced by the machine are equal. The strands should also be equally spaced apart in the length direction and width direction.

Fibrous non-woven sheets are described above and include spun-bonded fabrics such as those sold under the registered trademarks Tyvek®, Typar®, and Reemay® and spun-laced fabrics such as that sold under the registered trademark Sontara®. Thermoplastic compounds can also be used to make sheet materials having good stabilizing properties.

In addition to scrims and sheet materials, other materials may be used as the stabilizing layer. For example, velours, felts, woven, knitted, flocked, needle-punched and fusion-bonded fabrics may be used along with poly(vinyl chloride) resins, foamed urethane, and composite structures such as PVC vinyl flooring. These materials may be used independently or in combination with each other. For instance, the stabilizing layer may comprise a non-woven sheet adhered to a scrim. A brushed knitted fabric having loopy surface can also be used as a stabilizing layer. It is also recognized that these materials may be used in combination with each other. The type of material used for the stabilizing layer will vary depending on the desired properties of the composite floor covering. For instance, certain materials may be more effective in providing resistance against indentation marks from heavy furniture and appliances. Other materials may be more effective in providing puncture resistance or may provide better fabrication.

The stabilizing layer is attached to the underside, i.e., lower surface, of the decorative fabric by a suitable adhesive means which may be permanent or releasable. Examples of such adhesives include the following. Suitable aqueous latex adhesives include, for example, styrene-butadiene copolymers, ethylene/vinyl acetate copolymers, polyacrylates and blends thereof. Non-aqueous latex adhesives may also be used. Suitable thermoplastic adhesives include, for example, polyvinyl chlorides, polyurethanes, polyolefins, ethylene/vinyl ester copolymers, ethylene/alkyl (meth) acrylate copolymers, and ethylene/olefin copolymers. Suitable hot-melt adhesives include, for example, adhesives comprising a thermoplastic resin, tackifying resins, waxes, and plasticizers as described in U.S. Pat. Nos. 4,939,036 and 4,844,765. The thermoplastic and hot-melt adhesives in the form of films may be used. The stabilizing layer may be coated with the adhesive in any manner such as by spraying, dipping, kiss-roll coating, or by lamination. In other embodiments, the stabilizing layer may be attached to the underside of the decorative fabric by a pressure sensitive adhesive, mechanical means such as by a Velcro® hook and loop fastening system or by knitting the scrim to the decorative fabric, or by ultrasonic bonding.

Another key component of the composite floor covering in this invention is the cushioning layer which is in contact with the lower surface of the stabilizing layer. Preferably, the lower surface of the stabilizing layer is attached to the cushioning layer by such permanent or releasable adhesive means as described above, but this is not necessary. In some instances, it may be desirable to have the stabilizing layer simply lay on the cushioning layer. As will be discussed herein, the alternate embodiment of the invention comprehends this possibility.

The cushioning layer may comprise any suitable material such as for example, foamed compositions of rubber, latex, hot-melt resins, urethane, poly(vinyl chloride) resins. These compositions may be combined with fabrics such as velours, felts, wovens, non-wovens, knitted, flocked, needle-punched, and fusion-bonded to provide a good cushioning layer. Fibers used for the cushioning layer are polyamide, polyester, polyolefin, jute, acrylic or cotton. Carpets such as unitary carpets and particularly tufted carpets having a tufted primary backing laminated to a secondary backing may also be used. The thickness of the cushioning layer is at least one-tenth (0.1) inches and is preferably in the range of about 0.125 inches to about 0.625 inches. Preferably, the density of the cushioning layer is greater than three (3) lbs/ft$^3$. The thickness and density of the cushioning layer are significant, because these properties help provide the desired resilience and cushioning effect to the entire floor covering. The three layer laminate composite floor covering exhibits a puncture resistance of at least eight-hundred (800) inch-pounds per square inch (in-lb/in$^2$).

The cushioning layer may be a carpet comprising a primary backing laminated to secondary backing material with tufts of yarn projecting from the primary backing. The projecting tufts have tuft bases stitched into the primary backing and tuft tips extending therefrom. Such fibers include, for example, wool, polyamides (such as nylon 6,6 or nylon 6), polyesters, polyolefins (such as polypropylene), acrylics, rayon, and blends thereof. The primary backing may be a woven material of natural or synthetic materials such as jute, wool, rayon, polyamides, polyesters, and polyolefins. Nonwoven primary backings may also be used. The tufted primary backing is laminated to a secondary backing by a polymeric latex such as styrene-butadiene rubber (SBR), thermoplastic adhesive, or other suitable material. Examples of suitable secondary backings include jute, woven tapes of polypropylene, woven polypropylene fabrics, felts such as felts of shredded used carpet, and thermoplastic sheets. It is also recognized that used, discarded or recycled carpets could be used as the cushioning layer in the floor coverings of this invention. Other suitable materials include carpets or dhurries, either hand-made or machine-made, using cotton, jute, wool or other synthetic materials.

If a carpet having a tufted primary and secondary backing is used as the cushioning layer, it is preferable that the secondary backing be attached to the lower surface of the stabilizing layer (e.g., a scrim or non-woven sheet) and that the projecting tufts be in contact with the floor. However, in some instances, it may be desirable to attach the projecting tufts from the primary backing to the lower surface of the stabilizing layer. This may be done by spraying the tufts and decorative fabric with an adhesive.

In some instances, a carpet having a tufted primary backing laminated to a secondary backing or carpet tiles may be used as the stabilizing layer and cushioning layer. The secondary backing in tufted carpets is a particularly effective stabilizing layer, because it is typically a polypropylene scrim which is laminated to the tufted primary backing by latex and this scrim can be readily attached to the underside of the decorative fabric. Because of the tufted yarn pile the tufted primary backing is a particularly effective cushioning layer. The pile height, density, and weight may be adjusted to give the desired cushioning effect. Further, such a floor covering may be reversed in order to use the tufted primary backing layer as the surface layer. This would be particularly desirable in instances where good quality, colored, tufted yarns are used in the primary backing.

As noted earlier, in some instances (as where a cushioning layer is already available or is not believed necessary) it may be desirable to configure a floor covering in accordance with the present invention in an alternate fashion. The bracket 7 serves to indicate the alternate configuration of the floor covering 10'. In this embodiment the composite floor covering 10' is a laminate comprising the upper layer 1 of a decorative fabric having a protective polymeric coating attached to an intermediate stabilizing layer 3. All of the same materials as earlier discussed that are used for the fabric layer 1, the polymeric coating on the upper (and lower surface, if desired) thereof, the stabilizing layer 3, and the attachment mechanism therebetween, may be used in this alternate embodiment of the invention. The polymeric coating is applied to the upper layer of the fabric 1 in such a manner that the hand of the fabric is retained. With this embodiment of the invention it is desirable to utilize a mechanical fastener, generally indicated by the reference character 9, to releasably attach the floor covering 10' to the cushion layer. Preferably, the mechanical fastener 9 takes the form of a Velcro® tape fastener, with hook portion 9H of the fastener adhered to the cushioning layer, while the loop portion 9L of the fastener is formed on the lower surface of the stabilizing layer 3. The abovementioned brushed knitted fabric having the loopy surface may advantageously be used as a stabilizing layer in this instance. Other forms of flexible fabric-type mechanical fastener may be used. For example, a flexible fastener that utilizes mushroom-shaped members and cooperating resilient retaining members may be used.

Generally speaking, the combination of the materials used for the fabric layer 1, the stabilizing layer 3 and the cushioning layer 5 (if one is used), together with the polymeric coating on the upper surface of the fabric layer 1 (and on lower surface thereof, if provided), as well as the manner and materials by which these layers are attached, are selected to render the floor covering 10 or 10' substantially impervious to liquids.

For example, the manner of adhesive attachment of a fabric layer 1 (with a coating on the upper surface) and a stabilizing layer 3 can be selected to render the resulting floor covering (in either the form 10 or 10') substantially impervious to liquids. Thermoplastic adhesives and hot-melt adhesives, both as listed earlier, polyurethane adhesives (in any suitable form, including film form) are particularly suitable for this purpose.

It is noted that even though a woven material having a non-slippage polymeric undercoating is used as the fabric layer 1, one of the immediately above-listed adhesives (or another adhesive compatible with the polymeric undercoating) should be used to render the resulting floor covering 10 or 10' substantially impervious to liquids.

Alternatively or additionally, the material of the stabilizing layer 3 can be selected to render the resulting floor covering (in either the form 10 or 10') substantially impervious to liquids. For example, if the stabilizing layer 3 is selected in the form of a hydrophobic material and in an appropriately constructed non-woven, spun-bonded sheet, then, when the layer 3 is attached to the fabric 1 (using any compatible adhesive) the resulting floor covering 10 or 10' is substantially impervious to liquids.

In a three-layer laminate floor covering 10, the adhesive attachment of the cushioning layer 5 also contributes to rendering the floor covering 10 substantially impervious to liquids.

The present invention is further illustrated by the following examples, but these examples should not be considered as limiting the scope of the invention. The following Test Methods were used to measure the properties described in these examples.

TEST METHODS

PUNCTURE RESISTANCE—This test measures the energy required to puncture a material. Results are expressed as puncture resistance per unit area of the measurement probe. Samples are first conditioned at 75+/−2° F. and at 55+/−2% relative humidity (RH) for at least twenty-four (24) hours. The sample to be tested is then clamped taut in a frame mounted on an Elmendorff tear tester equipped with a Spencer impact attachment (Thwing-Albert Instrument Co. Philadelphia, Pa.). A 3/16-in. (4.76 mm) Spencer probe having a 1/10-in. (2.54 mm) radius hemispherical tip is used. The puncture resistance reported is the average of five (5) readings.

VETTERMAN DRUM TEST FOR WEAR—Wear test which closely correlate to floor trafficking were conducted in a Vetterman drum test apparatus, Type KSG, manufactured by Schoenber & Company, Bauber, Federal Republic of Germany, according to International Standards Organization (ISO) document TC38/12/WG 6 N 48. As specified, the drum is lined with the test samples into which is placed a sixteen (16) pound steel ball having fourteen (14) rubber buffers which rolls randomly inside the rotating drum. The test sample is mounted in such a way that the decorative fabric surface stays in contact with the steel ball and the bottom cushion layer stays against the drum. A circular brush within the drum is in light contact with the fabric surface and picks up loose fuzz of or fibers which are continuously removed by suction. After five thousand (5,000) and ten thousand (10,000) cycles, the samples are removed and inspected to evaluate texture and appearance retention. Five thousand cycles corresponds to five (5) years of residential use, while ten cycles corresponds to a lifetime of carpet use. Appearance retention is reported on a scale of one through five (1–5) with a rating of five (5) corresponding to a very slight change, a rating of four (4) corresponding to a lightly worn sample, a rating of three (3) corresponding to a moderately worn sample, a rating of two (2) corresponding to a clearly unacceptable wear and a rating of one (1) corresponding to an extremely matted sample. A rating of 2.5 serves as the transition point from acceptable to unacceptable wear.

STAINING TEST—Forty-five (45) grams of a cherry flavored, sugar sweetened, Kool-Aid® powder is mixed in five-hundred milliliters (500 ml) of water. The solution is allowed to reach room temperature (75+/−5° F.) before using. A white absorbent paper towel or blotter paper is placed beneath the cushioning layer of the test sample 10 (i.e., a floor covering with an attached cushioning layer). Twenty milliliters (20 ml) of Kool-Aid® solution is poured onto the test sample from the face fabric side through a 1½" diameter cylinder from a height of about six centimeters (6 cm) to create a circular stain. The cylinder is removed and the solution is mechanically worked onto the fabric, e.g., by hand, in order to obtain uniform staining. The sample is allowed to stay undisturbed for thirty (30) minutes. At the end of thirty (30) minutes the sample is lifted and the white absorbent paper examined for visual red staining. Room temperature water can be substituted for the Kool-Aid® solution as a staining liquid. If considerable amount of a staining solution has passed through the test sample, a severe staining will be visible. The sample will be termed as substantially impervious if none or a very slight amount of liquid has passed through the test sample leaving none or a few visible drops of staining on a white absorbent towel or blotter paper.

EXAMPLES

Example 1

A composite floor covering comprising a decorative fabric layer with a protective polymeric coating, a stabilizing layer, and a cushioning layer was prepared. The decorative fabric was a jacquard woven nylon/wool blend fabric, where the warp is one hundred (100) denier nylon with a ten (10) tpi (turns per inch) and the weft is a combination of "two-seven" (2/7) worsted wool with five (5) tpi and eighteen (18) denier per filament (dpf), 1245-denier four-hole, hollow, solution-dyed bulked continuous filament nylon available from E. I. DuPont de Nemours and Company under the registered trademarks Antron® and Lumena®. The fabric construction was one-hundred-eighty (180) ends per inch and seventy (70) picks per inch with an overall composition of 53/47 wool/nylon, and weighing about twenty-seven (27) ounces per square yard ($oz/yd^2$). The fabric was treated with a protective polymeric coating of Zonyl® 7040 available from E. I. DuPont de Nemours and Company to impart stain/soil resist properties. Further, the underside of the fabric was coated with an acrylic finish for a non-slippage treatment. The treated fabric was then laminated to the upper surface of the stabilizing layer with a polyurethane adhesive. The stabilizing layer was a brushed knit nylon fabric weighing about 2.2 ounces per square yard ($oz/yd^2$). A woven jute padding having a thickness of about 0.285 inches and a weight of about forty-eight (48) ounces per square yard ($oz/yd^2$) was used as a cushioning layer. The lower surface of the stabilizing layer was in the form of a loop-covered surface. The loop-covered surface of the stabilizing layer was adhesively attached to the cushioning layer using a styrene-butadiene rubber (SBR) latex. The composite flooring sample was allowed to dry at room temperature for twenty-four (24) hours in order for the adhesive to dry.

Example 2

A second composite floor covering sample was made using the same decorative fabric as in Example 1 except that the warp was two-hundred (200) denier nylon. The same processing steps were followed to complete the fabric finishing and laminating to the nylon scrim stabilizing layer. The lower surface of the stabilizing layer was again in the form of a loop-covered surface. A needlepunch felt with a rubber backing and a thickness of about 0.18 inches and a weight of 44.6 ounces per square yard ($oz/yd^2$) was used as the cushioning layer. The hook portion of a Velcro® tape mechanical fastener was adhered to the felt surface of the cushioning layer. The floor covering product was then assembled by simply pressing the loop covered lower surface of the stabilizing layer on to the hook portion of the upper surface of the cushioning layer. The upper decorative fabric layer with the stabilizing layer was able to be detached (as for cleaning, etc.) and re-attached for further use.

Example 3

A third composite floor covering sample comprising a decorative fabric layer with a protective polymeric coating, a stabilizing layer, and a cushioning layer was prepared. The lower surface of the stabilizing layer was again in the form of a loop-covered surface. The decorative fabric was a jacquard woven fabric where the warp threads were forty-five (45) denier polyester with fifteen (15) tpi (turns per inch) and the weft was eighteen (18) denier per filament (dpf), 1245-denier nylon, as in Example 1. The fabric construction was two-hundred-sixty-six (266) ends per inch, seventy (70) picks per inch and weight about 15.15 ounces per square yard ($oz/yd^2$). The fabric underwent the same finishing and lamination steps as described in Example 1. A needlepunch felt with a rubber backing and a thickness of about 0.18 inches and a weight of 44.6 ounces per square yard ($oz/yd^2$) was used as the cushioning layer. Further, the hook portion of a Velcro® tape mechanical fastener was adhered to the felt surface of the cushioning layer. The floor covering product was then assembled by simply pressing the loop covered lower surface of the stabilizing layer on to the hook portion of the upper surface of the cushioning layer. The upper decorative fabric layer with the stabilizing layer was able to be detached for purposes (as for cleaning, etc.) and re-attached for further use.

Example 4

A fourth composite floor covering sample was made using the same decorative fabric as in Example 2. The same processing steps were followed to complete the fabric finishing and laminating to the nylon scrim stabilizing layer. The lower surface of the stabilizing layer was again in the form of a loop-covered surface. In this case, the composite floor covering sample did not have a bottom cushioning layer.

When tested for staining there was no stain on the paper towel or blotter underneath the bottom stabilizing layer, indicating the sample to be substantially impervious to liquids.

Results

The samples of Examples 1, 2 and 3 were evaluated for Vetterman drum wear testing, stain testing, density measurement and puncture resistance. In each case the Vetterman drum wear test showed wear rating of five (5) after five-thousand (5,000) cycles showing no change and a wear rating of 4.5 after ten-thousand (10,000) cycles showing a very slight change in appearance rating. When tested for staining there was no stain on the paper towel or blotter paper underneath the cushioning layer, indicating the sample to be substantially impervious. The density was above ten (10) pounds per cubic foot ($lb/ft^2$) and the puncture resistance of the floor covering was greater than eight hundred (800) inch-pounds per square inch ($in-lb/in^2$).

In view of the foregoing it should be appreciated that the composite floor covering of the present invention combines the advantages of carpet and vinyl flooring. The fabric decorative layer of the composite floor covering is easier to clean and soil is removed more easily than with pile carpets. Simultaneously, the soft, cushioning feel and warmth of carpet are retained.

What is claimed is:

1. A composite floor covering comprising:
    a) a decorative fabric layer having an upper and lower surface, wherein at least the upper surface has a protective polymeric coating, the protective polymeric coating being applied so as to substantially retain the hand of the decorative fabric layer;
    b) at least one stabilizing layer having an upper and lower surface, and
    c) a cushioning layer having a thickness of at least one-tenth (0.1) inches and a density of greater than three (3) pounds per cubic foot ($lb/ft^3$),
    the lower surface of the decorative fabric layer being attached to the upper surface of the stabilizing layer and the lower surface of the stabilizing layer being attached to the upper surface of the cushioning layer such that the composite floor covering material is rendered substantially impervious to liquids;
    said floor covering material having a density of at least about ten (10) pounds per cubic foot ($lb/ft^3$), a puncture resistance of at least eight hundred (800) inch-pounds per square foot ($in-lb/in^2$), a Vetterman drum testing wear rating after ten-thousand (10,000) cycles of higher than (2.5).

2. The composite floor covering of claim 1, wherein the protective polymeric coating on the upper surface of the decorative fabric comprises a polymer selected from the group consisting of stain-resist agents, soil-resist agents, water-repellent agents, fluorochemicals, silicones, acrylics, and mixtures thereof.

3. The composite floor covering of claim 1, wherein the weight of a woven decorative fabric is about one (1) to about fifty (50) ounces per square yard ($oz/yd^2$) and the thickness of the decorative fabric is about ten (10) mils to about two-hundred (200) mils.

4. The composite floor covering of claim 1, wherein the stabilizing layer comprises a fabric selected from the group consisting of velour, felt, woven, knitted, flocked, needle-punched, and fusion-bonded fabrics.

5. The composite floor covering of claim 1, wherein the cushioning layer comprises a foamed composition selected from the group consisting of rubber, latex, urethane, and poly(vinyl chloride).

6. The composite floor covering of claim 1, wherein the cushioning layer comprises a fabric selected from the group consisting of velour, felt, woven, non-woven, knitted, flocked, needle-punched, and fusion-bonded fabrics.

7. The composite floor covering of claim 1, wherein the cushioning layer comprises fibers selected from the group consisting of polyamide, polyolefin, polyester, cotton, acrylic and jute.

8. The composite floor covering of claim 1, wherein the decorative layer is attached to the stabilizing layer by latex adhesives selected from the group consisting of styrene-butadiene rubber, styrene/acrylate copolymers, carboxylated vinylidiene chloride/butadiene copolymers, styrene/butadiene copolymers, ethylene/vinyl acetate copolymers, polyacrylates, and blends thereof.

9. The composite floor covering of claim 1, wherein the decorative layer is attached to the stabilizing layer by thermoplastic adhesives selected from the group consisting of polyvinyl chlorides, polyurethanes, polyolefins, ethylene/vinyl ester copolymers, ethylene/alkyl (meth) acrylate copolymers, ethylene/olefin copolymers, and mixtures thereof.

10. The composite floor covering of claim 1, wherein the decorative layer is attached to the stabilizing layer by a hot-melt adhesive comprising a thermoplastic resin.

11. The composite floor covering of claim 1, wherein the decorative layer is attached to the stabilizing layer by a pressure sensitive adhesive.

12. The composite floor covering of claim 1, wherein the decorative layer is attached to the stabilizing layer by a mechanical fastener.

13. The composite floor covering of claim 1, wherein the decorative layer is attached to the stabilizing layer by ultrasonic bonding.

14. The composite floor covering of claim 1, wherein the lower surface of the decorative fabric layer has a protective polymeric coating,
    the protective polymeric coating on the lower surface of the decorative fabric layer comprises a polymer selected from the group consisting of poly(vinyl chloride), plastisols, polyurethane, stain-resist agents, soil-resist agents, water-repellent agents, fluorochemicals, silicones, acrylics, and mixtures thereof.

15. The composite floor covering of claim 1, wherein the stabilizing layer is attached to the cushioning layer by a mechanical fastener.

16. The composite floor covering of claim 1, wherein the cushioning layer comprises a carpet having a backing with yarn pile extending from the backing, and the lower surface of the stabilizing layer is attached to the backing of the cushioning layer.

17. The composite floor covering of claim 1 wherein the decorative fabric layer is a woven fabric formed from a plurality of interleaved warp and weft yarns, the material of the warp yarns being selected from the group consisting of polyester, cotton, silk and nylon, each warp yarn having a total denier in the range from about forty (40) to about five-hundred (500), at least about forty-five percent (45%) of the weft yarns being selected from the group consisting of nylon, wool, cotton, polyester and polypropylene, each weft yarn having a total denier in the range from about one-hundred (100) to about four-thousand (4,000).

18. The composite floor covering of claim 17 wherein the remainder of the weft yarns are wool.

19. A composite floor covering comprising:

a decorative fabric layer having an upper and lower surface, wherein at least the upper surface has a protective polymeric coating, the protective polymeric coating being applied so as to substantially retain the hand of the decorative fabric layer;

at least one stabilizing layer having an upper and lower surface, wherein the lower surface of the decorative fabric layer and the upper surface of the stabilizing layer are attached to each other in a way such that the composite floor covering material is rendered substantially impervious to liquids.

20. The composite floor covering of claim 19 further comprising a mechanical fastener attached to the lower surface of the stabilizing layer for use in attaching the composite floor covering material to a cushioning layer.

21. The composite floor covering of claim 1 wherein the decorative fabric layer comprises a fabric selected from the group consisting of velours, felts, woven, non-woven, knitted, flocked, needle-punched, tufted, stitch bond, and fusion-bonded fabrics.

22. The composite floor covering of claim 1 wherein the stabilizing layer comprises a material selected from the group consisting of scrims, non-woven sheets, fabrics, poly (vinyl chloride) resins, thermoplastic compounds, foamed urethane, and poly(vinyl chloride) flooring.

23. The composite floor covering of claim 19 wherein the decorative fabric layer comprises a fabric selected from the group consisting of velours, felts, woven, non-woven, knitted, flocked, needle-punched, tufted, stitch bond, and fusion-bonded fabrics.

24. The composite floor covering of claim 19 wherein the stabilizing layer comprises a material selected from the group consisting of scrims, non-woven sheets, fabrics, poly (vinyl chloride) resins, thermoplastic compounds, foamed urethane, and poly(vinyl chloride) flooring.

* * * * *